US010573425B2

(12) United States Patent
Akaike et al.

(10) Patent No.: US 10,573,425 B2
(45) Date of Patent: Feb. 25, 2020

(54) ELECTRICALLY CONDUCTIVE PASTE AND ELECTRICALLY CONDUCTIVE FILM FORMED BY USING SAME

(71) Applicant: MITSUBISHI MATERIALS CORPORATION, Tokyo (JP)

(72) Inventors: Hiroto Akaike, Naka (JP); Kazuhiko Yamasaki, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 16/075,326

(22) PCT Filed: Sep. 14, 2016

(86) PCT No.: PCT/JP2016/077031
§ 371 (c)(1),
(2) Date: Aug. 3, 2018

(87) PCT Pub. No.: WO2017/141473
PCT Pub. Date: Aug. 24, 2017

(65) Prior Publication Data
US 2019/0043638 A1    Feb. 7, 2019

(30) Foreign Application Priority Data

Feb. 19, 2016 (JP) ................................ 2016-029460

(51) Int. Cl.
*H01B 1/22* (2006.01)
*C09D 5/24* (2006.01)
*B82Y 30/00* (2011.01)
*H01B 5/14* (2006.01)
*C09D 7/40* (2018.01)
*C09D 201/00* (2006.01)
*H01B 1/00* (2006.01)
*C09D 11/52* (2014.01)

(52) U.S. Cl.
CPC ............. *H01B 1/22* (2013.01); *C09D 5/24* (2013.01); *C09D 7/40* (2018.01); *C09D 11/52* (2013.01); *C09D 201/00* (2013.01); *H01B 1/00* (2013.01); *H01B 5/14* (2013.01)

(58) Field of Classification Search
CPC ... H01B 1/22; C09D 7/40; C09D 5/24; C09D 11/52; B82Y 30/00

USPC .............................. 252/500, 512, 514, 519.3
See application file for complete search history.

(56) References Cited

U.S. PATENT DOCUMENTS

| 2007/0075299 A1* | 4/2007 | Ninomiya ................ H01B 1/22 252/500 |
| 2009/0020733 A1* | 1/2009 | Hirakawa ................ H01B 1/22 252/519.33 |
| 2010/0208432 A1* | 8/2010 | Bhagwagar .......... H01L 23/3735 361/717 |
| 2013/0140501 A1* | 6/2013 | Nakabayashi ...... C23C 18/1641 252/514 |

FOREIGN PATENT DOCUMENTS

| JP | 2005-093145 A | 4/2005 | |
| JP | 2015-65139 A | 4/2015 | |
| WO | WO-2013191760 A1 * | 12/2013 | ............... C08K 9/08 |
| WO | 2015/147267 A1 | 10/2015 | |
| WO | 2016/114189 A1 | 7/2016 | |

OTHER PUBLICATIONS

Novak "Electroconductive adhesives based on epoxy and polyurethane resins filled with silver-coated inorganic fillers." Synthetic Metals 144 (2004) 13-19 (Year: 2004).*
Supplementary European Search Report dated Sep. 24,2019, issued for European Patent Application No. 16890610.5.
International Search Report dated Dec. 13, 2016, issued for PCT/JP2016/077031.

* cited by examiner

*Primary Examiner* — Tri V Nguyen
(74) *Attorney, Agent, or Firm* — Locke Lord LLP

(57) ABSTRACT

This electrically conductive paste contains a solvent, a binder resin that does not contain unsaturated bonds within the molecules, and silver-coated resin particles as an electrically conductive filler dispersed in the binder resin. The silver-coated resin particles include resin core particles comprising silicone rubber particles, and a silver coating layer covering the surface of the resin core particles. Furthermore, the average grain diameter of the silver-coated resin particles is 0.5-20 μm, and the silver-coated resin particles are contained at 30-75 vol. % with respect to 100 vol. % of the solids content of the electrically conductive paste.

8 Claims, No Drawings

ELECTRICALLY CONDUCTIVE PASTE AND ELECTRICALLY CONDUCTIVE FILM FORMED BY USING SAME

TECHNICAL FIELD

The present invention relates to an electrically conductive paste capable of forming an electrically conductive film excellent in stretchability and electrical conductivity such as wiring, an actuator electrode, a skin sensor, etc., which is required to have bending resistance to a flexible substrate, and an electrically conductive film formed by using the electrically conductive paste. This international patent application claims a priority right based on Japanese Patent Application No. 029460 (Japanese Patent Application No. 2016-029460) filed on Feb. 19, 2016, and the entire contents of Japanese Patent Application No. 2016-029460 are incorporated into this international application.

BACKGROUND ART

Heretofore, as an electrically conductive paste of this type, an electrically conductive paste in which an electrically conductive filler (B) is uniformly dispersed in a resin (A) has been disclosed (for example, see Patent document 1.). In this electrically conductive paste, the resin (A) is an aqueous dispersion (A1) of a conjugated double bond polymer containing a polyanion based on a sulfonated or sulfated rubber as a dopant, and as the resin (A), an aqueous dispersion (A2) of a conjugated double bond polymer containing a polymeric polyanion which contains an aromatic group showing high electrical conductivity may be further contained as a dopant within the range which does not impair extensibility. In addition, the electrically conductive filler (B) is a metal powder (B1) having an average grain diameter of 0.5-10 μm, and formulation amounts of the resin (A) and the electrically conductive filler (B) in the solid content of the electrically conductive paste are 50-80 vol. % and 20-50 vol. %, respectively. The above-mentioned metal powder (B1) may be mentioned noble metal powders such as silver powder, gold powder, platinum powder, palladium powder, etc., and base metal powders such as copper powder, nickel powder, aluminum powder, brass powder, etc. Further, as the above-mentioned electrically conductive filler, it is preferable to contain metal nanoparticles (B3) having an average grain diameter of 2-100 nm. As the metal nanoparticles (B3), there may be mentioned silver, bismuth, platinum, gold, nickel, tin, copper and zinc, and from the viewpoint of electrical conductivity, there may be mentioned copper, silver, platinum and gold, and it is particularly preferable that either one of or both of silver and copper is/are contained as a main component(s) (50 mass % or more).

In the electrically conductive paste thus constituted, the metal powder (B1) is uniformly dispersed in the resin (A) having stretchability and electrical conductivity, so that, by forming an effective electrically conductive network, the electrically conductive film formed by using the electrically conductive paste has high electrical conductivity, and can retain its high electrical conductivity even when the electrically conductive film is stretched. Also, when either one of or both of silver powder and copper powder is/are used as the metal powder (B1) and as the main component (50 mass % or more), a coating film showing high electrical conductivity can be obtained and it is advantageous from the viewpoint of cost. In addition, by further formulating metal nanoparticles (B3) in the electrically conductive paste as an electrically conductive filler, electrical conductivity can be improved and printability can be also improved. Further, the metal nanoparticles (B3) have the function of imparting electrical conductivity between the electrically conductive networks, so that it can be expected to improve electrical conductivity of the electrically conductive film.

PRIOR ART DOCUMENTS

Patent Documents

Patent document 1: JP 2015-65139A (claims 1, 2 and 7, paragraphs [0010], [0012], [0021] and [0034])

SUMMARY OF THE INVENTION

Problems to be Solved by the Invention

In the electrically conductive paste disclosed in the above-mentioned conventional Patent document 1, however, whereas an aqueous dispersion (A2) of a conjugated double bond polymer containing a polymeric polyanion having an aromatic group as a dopant, which shows high electrical conductivity within the range which does not impair extensibility is contained in the resin (A), the polymer containing such a conjugated double bond is liable to be oxidized or deteriorated by heat, light, stress, etc., so that an electrically conductive film formed by using this electrically conductive paste has poor reliability in long-term use and has a drawback that it cannot satisfy all of high conductivity, high stretchability and high reliability simultaneously. In addition, in the electrically conductive paste disclosed in the above-mentioned conventional Patent document 1, there is a problem that it takes much time and labor to prepare the resin (A) containing the aqueous dispersion (A2) of the conjugated double bond polymer.

A first object of the present invention is to provide an electrically conductive paste which can form an electrically conductive film excellent in reliability in long-term use and excellent in stretchability and electrical conductivity. A second object of the present invention is to provide an electrically conductive film that can be formed with a relatively small number of steps, is excellent in reliability in long-term use, and is excellent in stretchability and electrical conductivity.

Means to Solve the Problems

A first aspect of the present invention is an electrically conductive paste which comprises a solvent, a binder resin that does not contain unsaturated bonds within the molecule, silver-coated resin particles as an electrically conductive filler dispersed in the binder resin, wherein the silver-coated resin particle contains a resin core particle comprising a silicone rubber particle, and a silver coating layer covering the surface of the resin core particles, an average grain diameter of the silver-coated resin particles is 0.5-20 μm, the silver-coated resin particles are contained at 30-75 vol. % with respect to 100 vol. % of the solid content of the electrically conductive paste.

A second aspect of the present invention is an electrically conductive film formed by using the electrically conductive paste described in the first aspect.

Effects of the Invention

In the electrically conductive paste according to the first aspect of the present invention, the silver-coated resin particles as the electrically conductive filler contain resin core particles comprising the silicone rubber particles, and a silver coating layer covering the surface of the resin core particles, an average grain diameter of the silver-coated resin particles is 0.5-20 µm, the silver-coated resin particles are contained at 30-75 vol. % with respect to 100 vol. % of the solid content of the electrically conductive paste, so that when an electrically conductive film is formed by using the electrically conductive paste, and the electrically conductive film is stretched, the silver-coated resin particles also stretch in the stretching direction following stretching of the electrically conductive film. As a result, even when the electrically conductive film stretches, contact between the silver-coated resin particles in the electrically conductive film is maintained, so that an electrically conductive film excellent in stretchability and electrical conductivity can be obtained. In addition, the above-mentioned characteristics can be obtained without using a polymer containing an unsaturated bond such as a conjugated double bond, etc., which is liable to cause oxidation or deterioration by light, stress, etc., so that it is possible to obtain an electrically conductive film which satisfy all of high electrical conductivity, high stretchability, and reliability in long-term use.

In the electrically conductive film according to the second aspect of the present invention, the electrically conductive film is formed by using the above-mentioned electrically conductive paste, so that the same effect as described above can be obtained with this electrically conductive film.

EMBODIMENTS TO CARRY OUT THE INVENTION

Next, the embodiments of the present invention will be explained. The electrically conductive paste of the present invention comprises a solvent, a binder resin that does not contain unsaturated bonds within the molecules, and silver-coated resin particles as an electrically conductive filler dispersed in the binder resin. The silver-coated resin particles have resin core particles comprising silicone rubber particles, and a silver coating layer covering the surface of the resin core particles. Also, an average grain diameter of the silver-coated resin particles is 0.5-20 µm, preferably 1.0-10 µm. Here, the reason why the average grain diameter of the silver-coated resin particles is limited within the range of 0.5-20 µm is that if it is less than 0.5 µm, at the time of stretching the electrically conductive film formed by using the above-mentioned electrically conductive paste, deformation of the silver coated particles difficultly follow stretch of the electrically conductive film, and stretchability of the electrically conductive film is lowered, while if it exceeds 20 µm, a filling rate of the electrically conductive filler in the electrically conductive film is lowered, and electrical conductivity of the electrically conductive film is lowered. In the present specification, the average grain diameter of the silver-coated resin particles means an average value obtained by measuring diameters of 300 silver-coated resin particles using a scanning electron microscope (model name: SU-1500 manufactured by Hitachi High-Technologies Corporation) with software (product name: PC SEM) and a magnification of 5,000 times, and calculated. It refers to a value averaging the long sides other than the true sphere. The silver-coated resin particle may be a spherical particle, or it may not be spherical but may have an irregular shape such as a flat shape, a plate shape, or a needle shape.

On the other hand, the average thickness of the silver coating layer of the silver-coated resin particles is preferably 0.05-5.0 µm. In addition, an average grain diameter of the resin core particles of the silver-coated resin particles is preferably 0.45-15 µm, more preferably 0.9-9.0 µm by subtracting the thickness of the silver coating layer from the average grain diameter of the silver-coated resin particles. The resin core particles are preferably single particles without aggregation. Here, the reason why the average thickness of the silver coating layer of the silver-coated resin particles is limited within the range of 0.05-5.0 µm is that if it is less than 0.05 µm, when the silver-coated resin particles are dispersed as the electrically conductive filler, it is difficult to obtain contact points between the silvers so that it is difficult to impart sufficient electrical conductivity, while if it exceeds 5.0 µm, the silver-coated resin particles are difficult to stretch along with the stretching of the electrically conductive film. Also, the reason why the average grain diameter of the resin core particles is limited within the range of 0.45-15 µm is that if it is less than 0.45 µm, the resin core particles tend to aggregate more easily, the surface area of the resin core particles becomes large, so that it is necessary to increase the amount of silver for obtaining electrical conductivity necessary for the electrically conductive filler, and further good silver coating layer is difficultly formed, while if the average grain diameter exceeds 15 µm, there causes inconveniences that surface smoothness of the resin core particles is lowered, a contact ratio of the silver-coated resin particles is lowered whereby a resistance value is increased. The average grain diameter of the resin core particles is measured by the same method as the method of measuring the average grain diameter of the silver-coated resin particles. Also, an average thickness of the silver coating layer is a value determined by observing the cross section of 20 silver-coated resin particles by a transmission electron microscope (TEM), measuring the thickness of the silver coating layer of the silver-coated resin particles, and arithmetically averaging the obtained measured values.

[Method for Producing Silver-Coated Resin Particles]

The silver-coated resin particles of this embodiment are produced by the following method. First, the resin core particles are added to an aqueous solution of a tin compound kept at 25-45° C. to form a tin adsorption layer on the surface of the resin core particles. Then, an electroless silver plating solution not containing a reducing agent is brought into contact with a tin adsorption layer formed on the surface of the resin core particles, so that a silver substitution layer is formed on the surface of the resin core particles by the substitution reaction of the tin adsorption layer formed on the surface of the resin core particles and the silver in an electroless plating solution. Next, a reducing agent is added to the electroless silver plating solution to form a silver coating layer on the surface of the silver substitution layer of the resin core particles.

[Method for Forming Silver Coating Layer by Electroless Silver Plating]

On the surface of the resin core particles, a silver coating layer is provided. In general, when performing electroless plating on the surface of a nonconductor such as an organic material or an inorganic material, it is necessary to perform a catalyzing treatment on the surface of the nonconductor in advance. In this embodiment, as the catalyzing treatment, a treatment for providing a tin adsorption layer on the surface of the resin core particles is performed, and then, an electroless silver plating treatment is performed to form a silver coating layer. Specifically, the silver coating layer of the present embodiment is produced by the following method. First, the resin core particles are added to an aqueous solution of a tin compound kept at 25-45° C. to form a tin adsorption layer on the surface of the resin core particles.

Then, with the tin adsorption layer is contacted not containing the electroless silver plating solution, a silver substitution layer is formed on the surface of the resin core particles by the substitution reaction of the tin adsorption layer formed on the surface of the resin core particles and the silver in the electroless plating solution. Next, a reducing agent is added to the electroless silver plating solution to form a silver coating layer on the surface of the silver substitution layer of the resin core particles.

In order to form the above-mentioned tin adsorption layer, resin core particles are added to an aqueous solution of a tin compound and stirred, and then, the resin core particles are separated by filtration or centrifuged and washed with water. The stirring time is appropriately determined depending on the temperature of the aqueous solution of the tin compound and the content of the tin compound as described below, and is preferably 0.5-24 hours. The temperature of the aqueous solution of the tin compound is 25-45° C., preferably 25-35° C., and further preferably 27-35° C. If the temperature of the aqueous solution of the tin compound is less than 25° C., the temperature is too low, so the activity of the aqueous solution is lowered, and the tin compound does not sufficiently adhere to the resin core particles. On the other hand, if the temperature of the aqueous solution of the tin compound exceeds 45° C., the tin compound is oxidized, so that the aqueous solution becomes unstable and the tin compound does not sufficiently adhere to the resin core particles. When this treatment is carried out in an aqueous solution at 25-45° C., divalent ions of tin adhere to the surface of the resin core particles to form a tin adsorption layer.

As the above-mentioned tin compound, there may be mentioned stannous chloride, stannous fluoride, stannous bromide, stannous iodide, etc. In the case of using stannous chloride, the content of stannous chloride in the aqueous solution of the tin compound is preferably 30-100 g/dm$^3$. If the content of stannous chloride is 30 g/dm$^3$ or more, a uniform tin adsorption layer can be formed. Also, if the content of stannous chloride is 100 g/dm$^3$ or less, an amount of inevitable impurities in stannous chloride can be suppressed. Incidentally, stannous chloride can be contained in the aqueous solution of the tin compound until it is saturated.

After forming a tin adsorption layer on the surface of the resin core particles, an electroless plating solution containing no reducing agent is brought into contact with the tin adsorption layer to form a silver substitution layer on the surface of the resin core particles by the substitution reaction of tin and silver, subsequently, a reducing agent is added to the electroless silver plating solution to perform electroless plating whereby a silver coating layer is formed on the surface of the resin core particles to prepare silver-coated resin particles. As the electroless silver plating method, there may be mentioned (1) a method in which resin core particles on the surface of which is formed a silver substitution layer are immersed in an aqueous solution containing a complexing agent, a reducing agent, etc., and an aqueous solution of a silver salt is added dropwise thereto, (2) a method in which resin core particles on the surface of which is formed a silver substitution layer are immersed in an aqueous solution containing a silver salt and a complexing agent, and an aqueous solution of a reducing agent is added dropwise thereto, and (3) a method in which resin core particles on the surface of which is formed a silver substitution layer are immersed in an aqueous solution containing a silver salt, a complexing agent and a reducing agent, etc., and an aqueous solution of a caustic alkali is added dropwise thereto.

As the silver salt, silver nitrate or a material in which silver is dissolved in nitric acid, etc., can be used. As the complexing agent, ammonia, ethylenediaminetetraacetic acid, tetrasodium ethylenediaminetetraacetate, nitrilo triacetic acid, triethylenetetraammine hexaacetic acid, sodium thiosulfate, succinate, succinimide, salts such as citrate and iodide salt, etc., can be used. As the reducing agent, formalin, glucose, imidazole, Rochelle salt (sodium potassium tartrate), hydrazine and its derivatives, hydroquinone, L-ascorbic acid or formic acid, etc., can be used. As the reducing agent, formaldehyde is preferable from the viewpoint of the strength of reducing power, a mixture of two or more kinds of reducing agents containing at least formaldehyde is more preferable, and a mixture of reducing agents containing formaldehyde and glucose is most preferable.

In the step preceding the electroless silver plating treatment step, tin in the tin adsorption layer releases electrons by contacting with silver ions in the solution and dissolved out, and on the other hand, silver ions receive electrons from tin, and substitute and deposit as a metal at the portion of the resin core particles to which tin has been adsorbed. Thereafter, when all the tin is dissolved in the aqueous solution, the substitution reaction of tin and silver is completed. Subsequently, a reducing agent is added to the electroless plating solution, and a coating layer of silver is formed on the surface of the resin core particles by reducing reaction with the reducing agent whereby silver-coated resin particles are produced.

[Electrically Conductive Paste]

The electrically conductive paste of this embodiment contains, as described above, a solvent, a binder resin that does not contain unsaturated bonds within the molecules, and silver-coated resin particles as an electrically conductive filler dispersed in the binder resin. The silver-coated resin particles are contained in an amount of 30-75 vol. %, preferably 40-60 vol. % with respect to 100 vol. % of the solids content of the electrically conductive paste. Here, the reason why the content ratio of the silver-coated resin particles is limited within the range of 30-75 vol. % with respect to 100 vol. % of the solids content of the electrically conductive paste is that if it is less than 30 vol. %, when the silver-coated resin particles are dispersed as the electrically conductive filler, it is difficult to obtain contact points between the silvers so that it is difficult to impart sufficient electrical conductivity, while if it exceeds 75 vol. %, specific gravity of the silver-coated resin particles becomes large, the cost is increased and electrical conductivity is saturated.

[Binder Resin in Electrically Conductive Paste]

As the binder resin to be contained in the electrically conductive resin paste, it is possible to use a resin having a high shrinkage rate and containing no unsaturated bond inside thereof (in the molecule), and concretely, there may be mentioned a urethane resin, urethane rubber, an acrylic resin, acrylic rubber, butyl rubber, chlorosulfonated rubber, fluororubber and silicone. The urethane resin and urethane rubber can be used in either a solvent evaporation type or a thermosetting type in which a main agent and a curing agent are mixed. Here, the main agent may be mentioned polyester polyol, polycaprolactam polyol, polyether polyol, polycarbonate polyol, urethane acrylate, etc., and the curing agent may be mentioned isocyanate, block isocyanate, etc. Also, as the acrylic resin, commonly used thermosetting type, photopolymerization type and solvent evaporation type ones can be used, and there may be mentioned an acryl-melamine resin, a polymethyl methacrylate resin, an acryl-styrene copolymer, a silicon-modified acrylic resin, an epoxy-modified acrylic resin, etc., which can be used alone or in combination. Here, a thermal curing agent such as isocyanate, an alkylphenone-based photopolymerization initiator, etc., can be used as a curing agent, if necessary. Further, as the acrylic rubber, the butyl rubber, the chlorosulfonated rubber and the fluororubber, those of solvent evaporation type can be mainly used. On the other hand, the silicone may be specifically mentioned silicone rubber and silicone resin, which may be used either addition polymerization type or condensation polymerization type. Here, although the definition regarding the difference between the silicone rubber and the silicone resin is not clear, in the present specification, one having a shrinkage rate at break of 500% or more is referred to as silicone rubber, and one having less than 500% is referred to as silicone resin. Also, plural kinds of these binder resins may be used in combination. Among these binder resins, it is preferable to use a silicone rubber which is the same material as the resin core particles of the silver-coated resin particles. This is because, by making the binder resin the same material as the resin core particles, the shrinkage rate of the electrically conductive film becomes substantially the same and the value of the coefficient of thermal expansion becomes close, so that there is an advantage that thermal stress is difficultly caused at the time of thermosetting or under thermal environment. Also, as the solvent for dissolving the binder resin, there may be mentioned an ether alcohol-based solvent such as ethylene glycol monoethyl ether, ethylene glycol monobutyl ether, propylene glycol monomethyl ether, propylene glycol monoethyl ether, propylene glycol mono-n-butyl ether, diethylene glycol monoethyl ether, diethylene glycol monobutyl ether, dipropylene glycol monomethyl ether, dipropylene glycol monobutyl ether, tripropylene glycol monomethyl ether, etc., and an acetic acid ester-based solvent thereof, ethylene glycol, propylene glycol, an aromatic hydrocarbon-based solvent such as terpineol, mineral spirit and toluene, etc., an aliphatic hydrocarbon-based solvent such as dodecane, etc., dimethylformamide, N-methyl-2-pyrrolidone, dimethyl sulfoxide, diacetone alcohol, dimethylacetamide, γ-butyrolactone, etc.

[Method for Preparing Electrically Conductive Paste]

In the method for preparing the electrically conductive paste, the above-mentioned binder resin is firstly mixed with the above-mentioned solvent under the condition of preferably a temperature of 50-70° C., further preferably 60° C. to dissolve the binder resin in the solvent. At this time, a ratio of the binder resin is preferably made 20-60 vol. %, further preferably 35-50 vol. % with respect to 100 vol. % of the solvent. Next, the above-mentioned electrically conductive filler (the silver-coated resin particles) is added and mixed, for example, by a mixing machine which is subjected to simultaneous treatment of stirring and defoaming by two centrifugal forces of rotation and revolution such as Awatori Rentaro (product name of a mixer manufactured by Thinky Corporation), and then, mixed and kneaded preferably for 0.1-1 hour using a mixing and kneading machine such as a three-roll mill or mortar machine, etc., and pasted to prepare an electrically conductive paste. At this time, in order to provide a suitable viscosity and necessary fluidity to the electrically conductive paste to be prepared, and by the reason as mentioned above, mixing is carried out so that the electrically conductive filler occupying in the electrically conductive paste becomes to 30-75 vol. % as mentioned above. Also, an amount of the binder resin to be used is so adjusted that a volume ratio with the electrically conductive filler is the above-mentioned ratio by the reason as mentioned above. As a result, the viscosity is preferably adjusted to 10-300 Pa·s. By adjusting the viscosity within this range, printability of the electrically conductive paste is improved and the shape of the printed pattern after printing is well maintained.

The electrically conductive paste thus prepared is, for example, coated on a stretched PET (polyethylene terephthalate) film, a glass substrate, an ITO (Indium Tin Oxide) substrate, etc., which is a base material, dried and baked at a predetermined temperature, etc., whereby an electrically conductive film is formed on the above-mentioned substrate. The baking is carried out, for example, by using a device such as a hot-air circulating furnace, etc., and retaining preferably at a temperature of 150-250° C. for 0.5-1 hour, but when room temperature curing is preferable, it is not applied.

In the electrically conductive film thus formed, when the electrically conductive film is stretched, the silver-coated resin particles also stretch in the stretching direction following the stretching of the electrically conductive film. As a result, even when the electrically conductive film is stretched, contact between the silver-coated resin particles in the electrically conductive film is maintained, so that an electrically conductive film excellent in stretchability and electrical conductivity can be obtained. Also, if the binder resin is a silicone rubber or a silicone resin, when the electrically conductive film is formed by using the electrically conductive paste and the electrically conductive film is stretched, a stretching rate of the electrically conductive film and that of the silver-coated resin particles in the electrically conductive film becomes substantially the same. As a result, an electrically conductive film excellent in stretchability and electrical conductivity can be obtained without requiring a complicated process and without using a polymer containing an unsaturated bond such as a conjugated double bond, etc., as a binder. Also, the above-mentioned electrically conductive film does not contain an unsaturated bond such as a conjugated double bond, etc., in the molecule, so that oxidation and deterioration hardly occur due to heat, light, stress, etc. As a result, the above-mentioned electrically conductive film is excellent in reliability in long-term use since it is excellent in resistance to heat, light, stress, etc.

EXAMPLES

Next, Examples of the present invention are explained in detail with reference to Comparative examples.

Example 1

First, 15 g of stannous chloride and 15 cm$^3$ of hydrochloric acid with a concentration of 35% were diluted (mess up: diluting in measuring cylinder to a certain ml total) to 1 dm$^3$ with water by using a volumetric flask having a capacity of 1 dm$^3$, and kept at 25° C. To this aqueous solution was added 30 g of resin core particles comprising silicone rubber having an average grain diameter of 3 μm, and after stirring for 1 hour, the resin core particles were collected by filtration and washed with water. According to these procedures, pretreatment of the resin core particles was completed. Then, in 2 dm$^3$ of water were dissolved 100 g of tetrasodium ethylenediaminetetraacetate (complexing agent), 25 g of sodium hydroxide and 100 cm$^3$ of formalin (reducing agent: formaldehyde concentration 37 mass %) to prepare an aqueous solution containing a complexing agent and a reducing agent. Also, 190 g of silver nitrate, 100 cm$^3$ of an aqueous ammonia with a concentration of 25% and 400 cm$^3$ of water were mixed to prepare an aqueous solution containing silver nitrate. Next, 15 g of the pretreated resin core particles were immersed in 1,000 cm$^3$ of the above-mentioned aqueous solution containing the complexing agent and the reducing agent, and 300 cm$^3$ of the aqueous solution containing silver nitrate was added dropwise to this aqueous solution while stirring to cover the outer peripheral surface of the resin core particles with silver. Further, the resin core particles coated with silver were washed with water and dried to obtain silver-coated resin particles having an average grain diameter of 3.8 μm.

On the other hand, 5.0 g of a one-component silicone rubber "KE-45" (manufactured by Shin-Etsu Silicone Co., Ltd.) as a binder resin, 5.0 g of mineral spirit as a solvent and 0.1 g of KD-4 (manufactured by Croda Japan K.K.) as a dispersant were mixed with Awatori Rentaro (manufactured by Thinky Corporation) to prepare a binder varnish. Then, to 10 g of the above-mentioned binder varnish was added 15.0 g of the electrically conductive filler comprising the above-mentioned silver-coated resin particles, and after mixing these with Awatori Rentaro (manufactured by Thinky Corporation), mixed and kneaded using a three-roll mill (manufactured by EXAKT) to obtain an electrically conductive paste. This electrically conductive paste was referred to as Example 1. Incidentally, the content ratio of the silver-coated resin particles in the electrically conductive paste was 50 vol. % with respect to 100 vol. % of the solids content of the electrically conductive paste.

Example 2

An electrically conductive paste was prepared in the same manner as in Example 1 except that 3.6 g of a urethane resin "Adeka New Ace #50" (manufactured by ADEKA CORPORATION) was used as the binder resin in the electrically conductive paste of Example 1, 1.4 g of a block isocyanate "BURNOCK DN-992" (manufactured by DIC CORPORATION) was used as a curing agent, and 6.0 g of ethylene glycol monobutyl ether was used as a solvent. This electrically conductive paste was referred to as Example 2.

Example 3

An electrically conductive paste was prepared in the same manner as in Example 1 except that 5.0 g of a two-liquid type silicone resin "SE1700" (manufactured by Dow Corning Toray Co., Ltd.) in total of two liquids was used as the binder resin in the electrically conductive paste of Example 1, the average grain diameter of the silver-coated resin particles was made 0.5 μm, and the content ratio of the silver-coated resin particles in the electrically conductive paste was made 50 vol. % with respect to 100 vol. % of the solids content of the electrically conductive paste to prepare an electrically conductive paste. This electrically conductive paste was referred to as Example 3.

Example 4

An electrically conductive paste was prepared in the same manner as in Example 1 except that 5.0 g of one liquid type silicone rubber "KE-1820" (manufactured by Shin-Etsu Silicone Co., Ltd.) was used as the binder resin in the electrically conductive paste of Example 1, the average grain diameter of the silver-coated resin particles was made 1.0 μm (lower limit value of preferable range), and the content ratio of the silver-coated resin particles in the electrically conductive paste was made 50 vol. % with respect to 100 vol. % of the solids content of the electrically conductive paste to prepare an electrically conductive paste. This electrically conductive paste was referred to as Example 4.

Example 5

An electrically conductive paste was prepared in the same manner as in Example 1 except that the average grain diameter of the silver-coated resin particles in the electrically conductive paste of Example 1 was made 10 μm (upper limit value of preferable range), and the content ratio of the silver-coated resin particles in the electrically conductive paste was made 50 vol. % with respect to 100 vol. % of the solids content of the electrically conductive paste to prepare an electrically conductive paste. This electrically conductive paste was referred to as Example 5.

Example 6

An electrically conductive paste was prepared in the same manner as in Example 1 except that 4.5 g of an acrylic rubber "Nipol AR51" (manufactured by ZEON CORPORATION) was used as the binder resin in the electrically conductive paste of Example 1, 8.5 g of ethylene glycol monoethyl ether was used as the solvent, the average grain diameter of the silver-coated resin particles was made 20 μm, and the content ratio of the silver-coated resin particles in the electrically conductive paste was made 50 vol. % with respect to 100 vol. % of the solids content of the electrically conductive paste to prepare an electrically conductive paste. This electrically conductive paste was referred to as Example 6.

Example 7

An electrically conductive paste was prepared in the same manner as in Example 1 except that 5.0 g of a two-liquid type silicone resin "SE1700" (manufactured by Dow Corning Toray Co., Ltd.) in total of two liquids was used as the binder resin in the electrically conductive paste of Example 1, the average grain diameter of the silver-coated resin particles was made 10 μm, and the content ratio of the silver-coated resin particles in the electrically conductive paste was made 30 vol. % with respect to 100 vol. % of the solids content of the electrically conductive paste to prepare an electrically conductive paste. This electrically conductive paste was referred to as Example 7.

Example 8

An electrically conductive paste was prepared in the same manner as in Example 1 except that 5.0 g of a two-liquid type silicone resin "SE1700" (manufactured by Dow Corning Toray Co., Ltd.) in total of two liquids was used as the binder resin in the electrically conductive paste of Example 1, the average grain diameter of the silver-coated resin particles was made 10 μm, and the content ratio of the silver-coated resin particles in the electrically conductive paste was made 40 vol. % (lower limit value of preferable range) with respect to 100 vol. % of the solids content of the electrically conductive paste to prepare an electrically conductive paste. This electrically conductive paste was referred to as Example 8.

Example 9

An electrically conductive paste was prepared in the same manner as in Example 1 except that the average grain diameter of the silver-coated resin particles in the electrically conductive paste of Example 1 was made 10 μm, and the content ratio of the silver-coated resin particles in the electrically conductive paste was made 60 vol. % (upper limit value of preferable range) with respect to 100 vol. % of the solids content of the electrically conductive paste to prepare an electrically conductive paste. This electrically conductive paste was referred to as Example 9.

Example 10

An electrically conductive paste was prepared in the same manner as in Example 1 except that 4.5 g of an acrylic rubber "Nipol AR51" (manufactured by ZEON CORPORATION) was used as the binder resin in the electrically conductive paste of Example 1, 10.0 g of propylene glycol monoethyl ether was used as the solvent, the average grain diameter of the silver-coated resin particles was made 10 μm, and the content ratio of the silver-coated resin particles in the electrically conductive paste was made 75 vol. % with respect to 100 vol. % of the solids content of the electrically conductive paste to prepare an electrically conductive paste. This electrically conductive paste was referred to as Example 10.

Comparative Example 1

Silver particles having the average grain diameter of 3.6 μm were used in place of the electrically conductive filler of Example 1, 35.0 g of the electrically conductive filler comprising the above-mentioned silver particles was added to 10 g of the binder varnish of Example 1, the materials were mixed by Awatori Rentaro (manufactured by Thinky Corporation) and then mixed and kneaded by using a three-roll mill (manufactured by EXAKT) to obtain an electrically conductive paste. This electrically conductive paste was referred to as Comparative example 1. Incidentally, the content ratio of the silver particles in the electrically conductive paste was 50 vol. % with respect to 100 vol. % of the solids content of the electrically conductive paste.

Comparative Example 2

An electrically conductive paste was prepared in the same manner as in Example 1 except that 5.0 g of a two-liquid type silicone resin "SE1700" (manufactured by Dow Corning Toray Co., Ltd.) in total of two liquids was used as the binder resin in the electrically conductive paste of Example 1, the average grain diameter of the silver-coated resin particles was made 0.4 μm, and the content ratio of the silver-coated resin particles in the electrically conductive paste was made 50 vol. % with respect to 100 vol. % of the solids content of the electrically conductive paste to prepare an electrically conductive paste. This electrically conductive paste was referred to as Comparative example 2.

Comparative Example 3

An electrically conductive paste was prepared in the same manner as in Example 1 except that 3.6 g of a urethane resin "Adeka New Ace #50" (manufactured by ADEKA CORPORATION) was used as the binder resin in the electrically conductive paste of Example 1, 1.4 g of a block isocyanate "BURNOCK DN-992" (manufactured by DIC CORPORATION) was used as a curing agent, and 4.0 g of ethylene glycol monobutyl ether was used as the solvent, the average grain diameter of the silver-coated resin particles was made 22 μm, and the content ratio of the silver-coated resin particles in the electrically conductive paste was made 50 vol. % with respect to 100 vol. % of the solids content of the electrically conductive paste to prepare an electrically conductive paste. This electrically conductive paste was referred to as Comparative example 3.

Comparative Example 4

An electrically conductive paste was prepared in the same manner as in Example 1 except that 5.0 g of a two-liquid type silicone resin "SE1700" (manufactured by Dow Corning Toray Co., Ltd.) in total of two liquids was used as the binder resin in the electrically conductive paste of Example 1, the average grain diameter of the silver-coated resin particles was made 10 μm, and the content ratio of the silver-coated resin particles in the electrically conductive paste was made 28 vol. % with respect to 100 vol. % of the solids content of the electrically conductive paste to prepare an electrically conductive paste. This electrically conductive paste was referred to as Comparative example 4.

Comparative Example 5

An electrically conductive paste was prepared in the same manner as in Example 1 except that the average grain diameter of the silver-coated resin particles in the electrically conductive paste of Example 1 was made 10 μm, and the content ratio of the silver-coated resin particles in the electrically conductive paste was made 77 vol. % with respect to 100 vol. % of the solids content of the electrically conductive paste to prepare an electrically conductive paste. This electrically conductive paste was referred to as Comparative example 5.

Comparative Example 6

By using 2.5 g of an acrylic rubber "Nipol AR51" (manufactured by ZEON CORPORATION) and 10 g of a rubber type solvent type adhesive "TB1521" having unsaturated bonds (manufactured by ThreeBond Holdings Co., Ltd., chloroprene rubber) as the binder resins, and using 2.5 g of mineral spirit as the solvent, these were mixed to prepare a binder varnish. To 12.5 g of the prepared binder varnish was added 15.0 g of the electrically conductive filler comprising the silver-coated resin particles of Example 1, and the materials were mixed by Awatori Rentaro (manufactured by Thinky Corporation), and then, mixed and kneaded by using a three-roll mill (manufactured by EXAKT) to obtain an electrically conductive paste. This electrically conductive paste was referred to as Comparative example 6.

Comparative Test 1 and Evaluation

The electrically conductive pastes of Examples 1-10 and Comparative examples 1-6 were each coated on a stretched PET film of A4 size by a bar coater with a thickness of 150 μm, and then, the film coated with this electrically conductive paste was placed in a baking furnace and held at 50° C. for 12 hours to evaporate the volatile components from the electrically conductive paste to dry the electrically conductive paste, whereby an electrically conductive film was obtained. The content ratio of the electrically conductive filler in the electrically conductive film was 55 vol. % when the entire electrically conductive film was made 100 vol. %. The above-mentioned electrically conductive film was cut into a rectangular shape having longitudinal and transverse length of 50 mm and 10 mm, respectively, and then, peeled off from the stretched PET film to prepare 12 sheets of test pieces of the electrically conductive film, respectively.

Then, for the test pieces of Examples 1-10 and Comparative examples 1-6, measurements of volume resistivity before and after stretching and reliability test were carried out, respectively. The measurements of the volume resistivity before and after stretching were carried out by measuring the volume resistivity of each of 4 sheets of test pieces before stretching (stretching rate 0%) with Loresta-GP MCP-T610 (manufactured by Mitsubishi Chemical Analytech Co., Ltd.), respectively, and an average value thereof was calculated and this was made the volume resistivity of the test piece before stretching. Next, the volume resistivity of each of 4 sheets of test pieces after stretching at an stretching rate of 50% was measured with Loresta-GP MCP-T610 (manufactured by Mitsubishi Chemical Analytech Co., Ltd.), respectively, and an average value thereof was calculated and this was made the volume resistivity of the test piece after stretching at an stretching rate of 50%. Further, the volume resistivity of each of 4 sheets of test pieces after stretching at an stretching rate of 80% was measured with Loresta-GP MCP-T610 (manufactured by Mitsubishi Chemical Analytech Co., Ltd.), respectively, and an average value thereof was calculated and this was made the volume resistivity of the test piece after stretching at an stretching rate of 80%. The results are shown in Table 1. In addition, after stretching each test piece at stretching rates of 0%, 50% and 80%, whether or not cracks occurred in the test piece (presence or absence of cracks) was observed with naked eyes. The results are shown in Table 1 as the presence or absence of cracks before the reliability test. Incidentally, the test piece was stretched in the longitudinal direction. Also, when the distance (stretching direction) between two points at which the volume resistivity is measured in the test piece before stretching is made $L_0$, and a distance (increment of distance) obtained by subtracting $L_0$ from the distance (stretching direction) between two points at which the volume resistivity is measured in the test piece after stretching is made $\Delta L$, the stretching rate (%) is calculated from $[(\Delta L/L_0) \times 100]$.

On the other hand, in the reliability test, test pieces of Examples 1-10 and Comparative examples 1-6 were each placed in a high temperature and high humidity tank maintained at a temperature and a humidity of 85° C. and 85%, respectively, and allowed to stand for 500 hours, and taken out test pieces were, after stretched at stretching rates of 0%, 50% and 80%, whether or not cracks occurred in the test piece (presence or absence of cracks) was observed with naked eyes. The results are shown in Table 1 as the presence or absence of cracks after the reliability test. Incidentally, in Table 1, the average grain diameter of the silver-coated resin particles in the electrically conductive paste, the content ratio of the silver-coated resin particles in the electrically conductive paste with respect to 100 vol. % of the solids content of the electrically conductive paste, the kind of the binder resin, and whether the binder resin has an unsaturated bond or not (presence or absence of unsaturated bond) were described.

TABLE 1

| | Silver-coated resin particle | | Binder resin | | Volume resistivity ($\times 10^{-4}$ $\Omega \cdot$ cm) | | | Presence or absence of cracks before reliability test | Presence or absence of cracks after reliability test |
|---|---|---|---|---|---|---|---|---|---|
| | Average grain diameter (μm) | Content ratio (vol. %) | Kind | Presence or absence of unsaturated bond | Stretching rate 0% | Stretching rate 50% | Stretching rate 80% | | |
| Example 1 | 3.8 | 50 | Silicone rubber | None | 1.2 | 1.4 | 1.5 | None | None |
| Example 2 | 3.8 | 50 | Urethane resin | None | 2.4 | 2.6 | 2.8 | None | None |
| Example 3 | 0.5 | 50 | Silicone resin | None | 8.9 | 9.0 | 9.1 | None | None |
| Example 4 | 1.0 | 50 | Silicone rubber | None | 4.8 | 5.2 | 7.2 | None | None |
| Example 5 | 10 | 50 | Silicone rubber | None | 3.5 | 3.8 | 6.2 | None | None |
| Example 6 | 20 | 50 | Acrylic rubber | None | 7.9 | 8.5 | 9.8 | None | None |
| Example 7 | 10 | 30 | Silicone resin | None | 8.9 | 9.5 | 9.8 | None | None |
| Example 8 | 10 | 40 | Silicone resin | None | 6.2 | 6.5 | 6.7 | None | None |
| Example 9 | 10 | 60 | Silicone rubber | None | 3.2 | 3.4 | 3.5 | None | None |
| Example 10 | 10 | 75 | Acrylic rubber | None | 2.6 | 2.7 | 2.9 | None | None |
| Comparative example 1 | 3.6 (silver particles) | 50 | Silicone rubber | None | 5.0 | 820 | 3,060 | None | None |
| Comparative example 1 | 3.6 (silver particles) | 50 | Silicone rubber | None | 5.0 | 820 | 3,060 | None | None |
| Comparative example 2 | 0.4 | 50 | Silicone resin | None | 8.5 | 10.0 | 4,020 | Present | Present |
| Comparative example 3 | 22 | 50 | Urethane resin | None | 10.4 | 11.2 | 18.2 | Present | Present |
| Comparative example 4 | 10 | 28 | Silicone resin | None | 12.0 | 18.0 | 30.0 | None | None |
| Comparative example 5 | 10 | 77 | Silicone rubber | None | 2.5 | 2,800 | 4,340 | Present | Present |
| Comparative example 6 | 3 | 50 | Acrylic rubber, chloroprene rubber | Present | 1.9 | 2.3 | 3.4 | None | Present |

As clearly seen from Table 1, in the test piece of Comparative example 1 using not the silver-coated resin particles but the silver particles, although the volume resistivity of the electrically conductive film before stretching (stretching rate 0%) was small as $5.0 \times 10^{-4}$ $\Omega \cdot$cm, when it was stretched at the stretching rate of 80%, the volume resistivity of the electrically conductive film became extremely large as $3,060 \times 10^{-4}$ $\Omega \cdot$cm. Also, in the test piece of Comparative example 2 using the silver-coated resin particles in which the average grain diameter was small as 0.4 μm, although the volume resistivity of the electrically conductive film before stretching (stretching rate 0%) was small as $8.5 \times 10^{-4}$ Ω·cm, when it was stretched at the stretching rate of 80%, the volume resistivity of the electrically conductive film became extremely large as $4,020 \times 10^{-4}$ Ω·cm, and in the test piece of Comparative example 3 using the silver-coated resin particles in which the average grain diameter was large as 22 μm, the volume resistivity of the electrically conductive film before stretching (stretching rate 0%) was relatively large as $10.4 \times 10^{-4}$ Ω·cm, and when it was stretched at the stretching rate of 80%, the volume resistivity of the electrically conductive film was increased to $18.2 \times 10^{-4}$ Ω·cm. To the contrary, in the test pieces of Examples 1-6 using the silver-coated resin particles having the average grain diameter of 0.5-20 μm which is an appropriate range, the volume resistivities of the electrically conductive films before stretching (stretching rate 0%) were small as $1.2 \times 10^{-4}$–$8.9 \times 10^{-4}$ Ω·cm, and even when these were stretched at the stretching rate of 80%, the volume resistivities of the electrically conductive films were slightly increased as $1.5 \times 10^{-4}$–$9.8 \times 10^{-4}$ Ω·cm. In particular, in the test pieces of Examples 1, 2, 4 and 5 using the silver-coated resin particles having the average grain diameter of 1.0-10 μm which is more suitable range (preferable range), the volume resistivities of the electrically conductive films before stretching (stretching rate 0%) were further small as $1.2 \times 10^{-4}$–$4.8 \times 10^{-4}$ Ω·cm, and even when these were stretched at the stretching rate of 80%, the volume resistivities of the electrically conductive films were only slightly increased as $1.5 \times 10^{-4}$–$7.2 \times 10^{-4}$ Ω·cm. Further, as can be clearly seen from the presence or absence of cracks before the reliability test in Table 1, in the test pieces of Comparative examples 2 and 3, cracks occurred in the electrically conductive films irrespective of before and after stretching, while in the test pieces of Examples 1-6, no crack occurred in the electrically conductive films irrespective of before and after stretching, and flexibility was maintained. Among them, in particular, in Example 1 using silicone rubber as the binder resin, the binder resin is the same kind as the silicone rubber particles of the electrically conductive filler and the content ratio is also the same, so even when it is compared with Example 2 using the urethane rubber as the binder resin, the values of the volume resistivities of the electrically conductive films were excellent in any of the stretching rates and the best characteristics were shown.

On the other hand, in the test piece of Comparative example 4 in which the content ratio of the silver-coated resin particles was little as 28 vol. %, the volume resistivity of the electrically conductive film before stretching (stretching rate 0%) was relatively large as $12.0 \times 10^{-4}$ Ω·cm, and when it was stretched at the stretching rate of 80%, the volume resistivity of the electrically conductive film was increased to $30.0 \times 10^{-4}$ Ω·cm, and in the test piece of Comparative example 5 in which the content ratio of the silver-coated resin particles was large as 77 vol. %, the volume resistivity of the electrically conductive film before stretching (stretching rate 0%) was small as $2.5 \times 10^{4}$ Ω·cm, but when it was stretched at the stretching rate of 80%, the volume resistivity of the electrically conductive film became extremely large as $4,340 \times 10^{4}$ Ω·cm. To the contrary, in the test pieces of Examples 1 and 6-8 in which the content ratios of the silver-coated resin particles were in the suitable range of 30-75 vol. %, the volume resistivities of the electrically conductive films before stretching (stretching rate 0%) were small as $1.2 \times 10^{-4}$–$8.9 \times 10^{-4}$ Ω·cm, and even when these were stretched at the stretching rate of 80%, the volume resistivities of the electrically conductive films were only slightly increased as $1.5 \times 10^{-4}$–$9.8 \times 10^{-4}$ Ω·cm. In particular, in the test pieces of Examples 1, 2, 8 and 9 in which the content ratios of the silver-coated resin particles were in the more suitable range (preferable range) of 40-60 vol. %, the volume resistivities of the electrically conductive films before stretching (stretching rate 0%) were further small as $1.2 \times 10^{-4}$–$3.2 \times 10^{-4}$ Ω·cm, and even when these were stretched at the stretching rate of 80%, the volume resistivities of the electrically conductive films were further only slightly increased as $1.5 \times 10^{-4}$ Ω·cm-$3.5 \times 10^{-4}$. In addition, as can be clearly seen from the presence or absence of cracks before the reliability test in Table 1, in the test piece of Comparative example 5, cracks occurred in the electrically conductive film irrespective of before and after stretching, while in the test pieces of Examples 1, 2 and 7-10 and the test piece of Comparative example 4, no crack occurred in the electrically conductive films irrespective of before and after stretching, and flexibility was maintained.

On the other hand, in the test piece of Comparative example 6 in which the binder resin had unsaturated bonds, no crack occurred in the electrically conductive film before the reliability test, but cracks occurred in the electrically conductive film after the reliability test. To the contrary, in the test pieces of Examples 1-10 in which the binder resins had no unsaturated bond, no crack occurred in the electrically conductive films before the reliability test, and no crack also occurred in the electrically conductive films after the reliability test, and flexibility was maintained.

UTILIZABILITY IN INDUSTRY

The electrically conductive paste of the present invention can be used for forming an electrically conductive film excellent in stretchability and electrical conductivity such as wiring, an actuator electrode, a skin sensor, etc., which are required to have bending resistance to a flexible substrate.

The invention claimed is:

1. An electrically conductive paste which comprises a solvent, a binder resin that does not contain unsaturated bonds within a molecule, and silver-coated resin particles as an electrically conductive filler dispersed in the binder resin,
   the silver-coated resin particle has a resin core particle comprising a silicone rubber particle, and a silver coating layer covering a surface of the resin core particle,
   an average grain diameter of the silver-coated resin particles is 0.5-10 μm, and
   the silver-coated resin particles are contained at 30-75 vol. % with respect to 100 vol. % of a solid content of the electrically conductive paste; and
   wherein the binder resin is selected from the group consisting of silicone resin, silicone rubber, acrylic rubber, urethane resin and mixtures thereof.

2. An electrically conductive film formed by using the electrically conductive paste according to claim 1.

3. The electrically conductive paste according to claim 1, wherein the binder resin comprises a silicone rubber.

4. An electrically conductive film formed by using the electrically conductive paste according to claim 3.

5. The electrically conductive paste according to claim 1, wherein the average grain diameter of the silver-coated resin particles is 1.0-10 μm.

6. An electrically conductive film formed by using the electrically conductive paste according to claim 5.

7. The electrically conductive paste according to claim 1, wherein the silver-coated resin particles are contained at 40-60 vol. % with respect to 100 vol. % of a solid content of the electrically conductive paste.

8. An electrically conductive film formed by using the electrically conductive paste according to claim 7.

* * * * *